United States Patent

[11] 3,619,652

[72] Inventor Hugh M. Ogle
Palo Alto, Calif.
[21] Appl. No. 805,665
[22] Filed Mar. 10, 1969
[45] Patented Nov. 9, 1971
[73] Assignee Integrated Motorcontrol, Inc.

[54] MOTOR CONTROL DEVICE
1 Claim, 7 Drawing Figs.

[52] U.S. Cl. .................................................. 307/252 N,
307/252 W, 307/284, 307/305, 323/22 SC
[51] Int. Cl. ...................................................... H03k 17/04,
H03k 17/10, H03k 17/72
[50] Field of Search .......................................... 307/252,
284, 305, 247, 252 N, 252 W

[56] References Cited
UNITED STATES PATENTS
3,299,288   1/1967   McDowell et al. ............. 307/252 X
3,409,786   11/1968  Nemeth ......................... 307/247
3,328,603   6/1967   Dunn et al. .................... 307/215

OTHER REFERENCES
Gruodois, " Cam Operated Inductive Load Driver," IBM Technical Disclosure Bulletin, V. 4, NO. 9, 2/1962

Anhouse, " D.C. SCR Load Drivers," Electro-technology Design Trends, 3/1967, (one page)
Solid State Products, Inc. Bulletin, 7/1961, (one page)
G.E. Transistor Manual, 1964, (pg. 324)
G.E. Controlled Rectifier Manual, 1960, (pg. 109)

*Primary Examiner*—Donald D. Forrer
*Assistant Examiner*—L. N. Anagnos
*Attorney*—Fryer, Tjensvold, Feix, Phillips & Lempio ABSTRACT: A motor control device employing a low-power silicon-controlled rectifier in parallel with a power transistor. The silicon-controlled rectifier initially conducts current from the power source to the load and then triggers the power transistor so that they together conduct the power to the load with the power transistor handling most of the current. The power transistor is turned on by the voltage across a resistor, on a capacitive or inductive reactance element in series with a silicon-controlled rectifier. In another embodiment a diode is used in series with the base of the power transistor and an external pulse is used to back bias the diode to turn off the circuit. In a further embodiment a low-power transistor is used in series with the silicon-controlled rectifier wherein the circuit is turned off by turning off the low-power transistor.

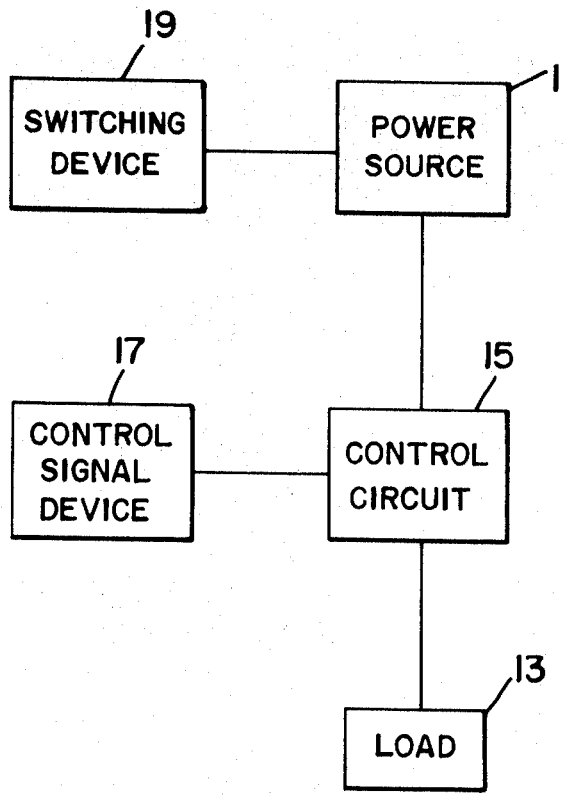
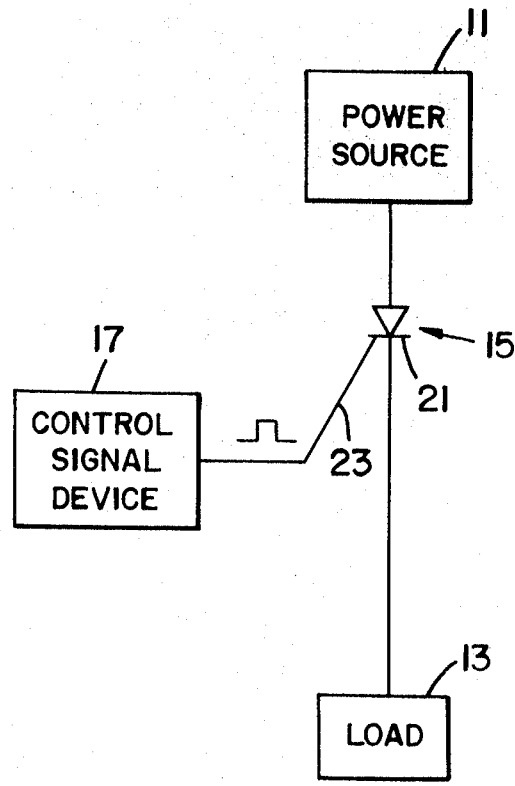
FIG_1  FIG_2
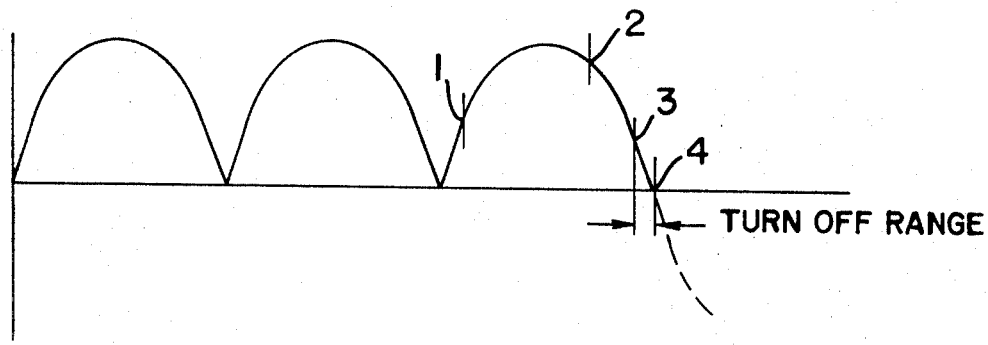
FIG_3

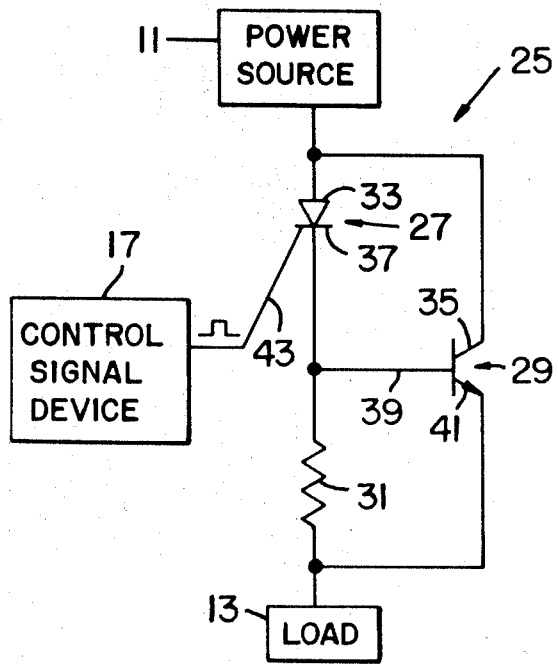
FIG_4
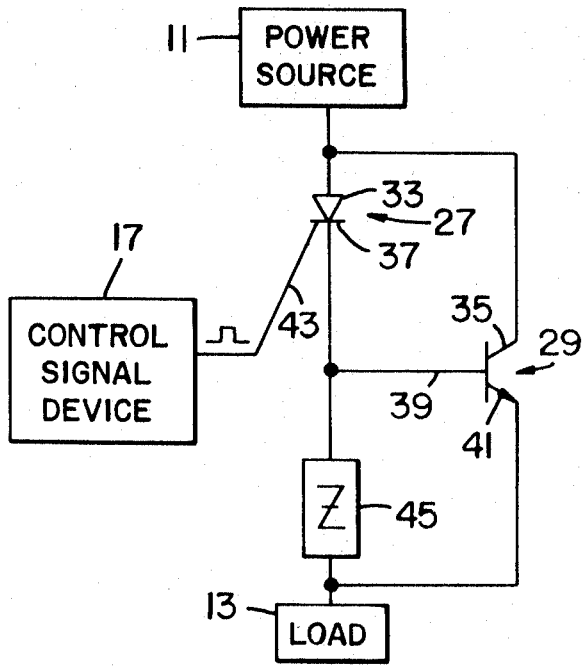
FIG_5
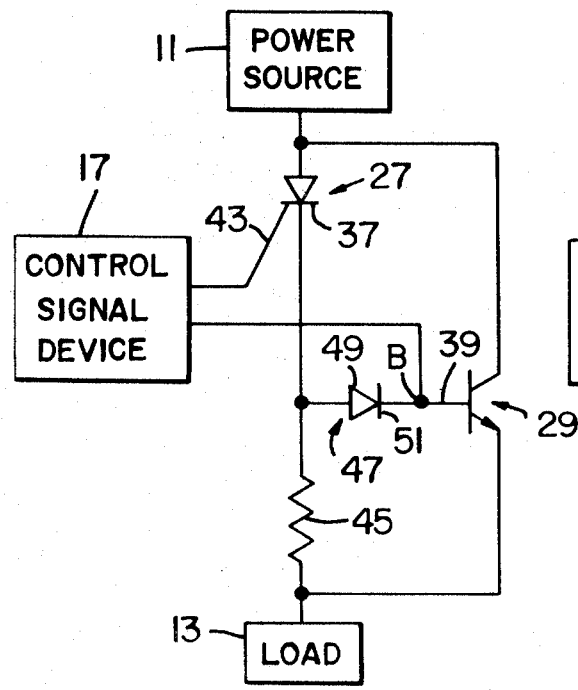
FIG_6
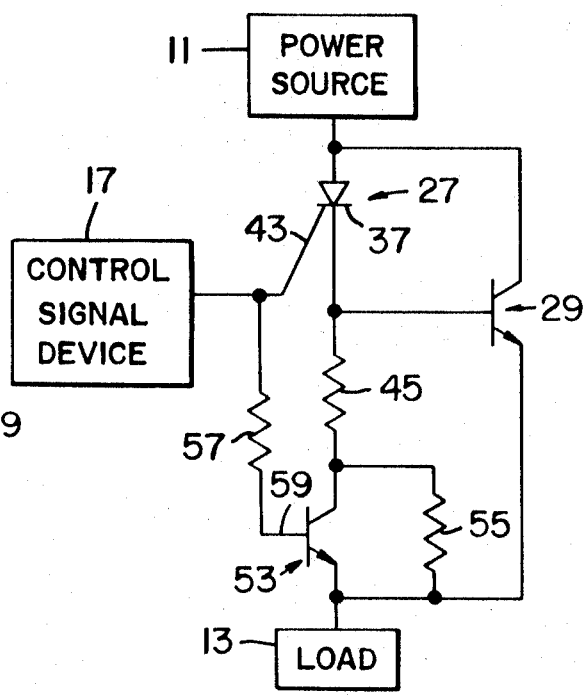
FIG_7
INVENTOR.
HUGH M. OGLE

MOTOR CONTROL DEVICE

The present invention relates to a motor control device and more particularly to a motor control device employing a power transistor and a silicon-controlled rectifier.

Conventional motor control circuits used by those skilled in the art have involved the use of a silicon-controlled rectifier in series with a power source and the load. In the past, when it has been necessary to control relatively large currents, a high-power silicon-controlled rectifier has been used in series with the load. In the past, when it has been necessary to control relatively large currents, a high-power silicon-controlled rectifier has been used in series with the load. While this circuit is very effective for low-power control and for many high-power control applications, it has a severe disadvantage when it is necessary to have precise high-power control. This is because a high-power silicon-controlled rectifier has a large turn-off range that has substantial variation as a function of the load and of the silicon-controlled rectifier for motor control has been found to be quite inefficient, because transistors do not have the rapid turn-on and turn-off (snap action) of silicon-controlled rectifiers. This snap action is required to keep the power dissipated in the power control elements low.

The present invention overcomes these disadvantages by employing a low-power silcon-controlled rectifier in parallel with a power transistor wherein the silicon-controlled rectifier initially conducts current, and then triggers the power transistor so that they together conduct the current to the load. In this manner accurate control is achieved since the low-power silicon-controlled rectifier has a very small turn-off range, as distinguished from the large turn-off range of high-power silicon-controlled rectifiers. In addition, the major part of the load current is handled by the high power transistor. However, even though a power transistor is employed, snap action and low-power dissipation is achieved, because the low-power silicon-controlled rectifier provides the required snap action.

The power transistor is turned on by the voltage across a resistor or a capacitive or inductive reactance element in series with the silicon-controlled rectifier. In these situations, turn-off is achieved by the characteristics of the silicon-controlled rectifier.

In another embodiment a diode is used in series with the base of the power transistor and an internal pulse is used to back bias the diode to turn off the circuit. In still another embodiment, a transistor of the low-power type is used in series with the silicon-controlled rectifier wherein the circuit is turned off by turning off the low-power transistor.

Other objects, advantages and novel features of the invention will become apparent from the following detailed description of the invention when considered in conjunction with the accompanying drawings wherein:

FIG. 1 is a block diagram of a conventional electrical power control circuit;

FIG. 2 is a block diagram of a conventional electrical power control circuit employing a silicon-controlled rectifier;

FIG. 3 is a diagram representing the output of a power source frequently used with power control circuits;

FIG. 4 is a schematic diagram of one embodiment of the present invention employing a resistor in the switching element for the power transistor;

FIG. 5 is another embodiment of the present invention where a reactive element, either capacitive or inductive, is used in the switching element for the power transistor;

FIG. 6 is still another embodiment of the present invention where turn-off of the circuit is achieved by back biasing a diode; and FIG. 7 is still another embodiment of the present invention where a low-power transistor is connected in series with the silicon-controlled rectifier for achieving turn-off of the circuit.

FIG. 1 illustrates in block diagram a conventional electrical power control circuit having a power source 11 connected to a load 13 through a control circuit 15. The control circuit is controlled by the output signal of control signal device 17. The power source 11 of such a circuit may have an AC signal or a pulsating DC, and may be turned on and off by means of a signal from switching device 19. The load 13 may be an AC or DC electric motor. The control circuit 15 is a circuit which will furnish a certain controlled amount of power to the load 13 as determined by control signal device 17.

A conventional control circuit 15 used by those skilled in the art of motor control has been the use of a silicon-controlled rectifier in series with the power source 11 and the load 13. In the past, when it has been necessary to control relatively large currents, a high-power silicon-controlled rectifier 21 has been used as illustrated in the conventional circuit of FIG. 2. While this circuit is very effective for low-power control and for many high-power control applications, it has a severe disadvantage when it is necessary to have precise high-power control. The reason for this can be seen by reference to FIG. 3 which represents the output signal from power source 11 which, as illustrated, is a full wave rectified power signal. Points 1 and 2 on this curve represent turn on points of the silicon-controlled rectifier. That is, at point 1 the leading edge of a pulse from control signal device 17, that is applied to gate 23, occurs relatively early in the sine wave cycle. When this pulse is applied to the gate, then silicon-controlled rectifier 21 turns on and remains on until late in the cycle. The pulse from control signal device is of relating short duration. However, the silicon-controlled rectifier remains on as long as there is sufficient holding current which is which is largely determined by the voltage level of the signal applied from power source 11 to the anode of silicon-controlled rectifier 15. The silicon-controlled rectifier turns off at points 3 or 4, depending upon a variety of factors as described below. Power is transmitted through the silicon-controlled rectifier from the turn-on point (points 1 or 2, for example) to the turn-off point (points 3 or 4, for example). The turn-off range is primarily determined by the characteristics of the silicon-controlled rectifier and ambient temperature. That is, the turn-off range is very small (essentially at point 4) when a low-power silicon-controlled rectifier is employed. However, as previously indicated it is necessary to employ a high-power silicon-controlled rectifier when the load is large. With a high-power silicon-controlled rectifier there is a large turn-off range that varies as a function of load and ambient temperature due to the internal characteristics of the the high-power silicon-controlled rectifier. Not only is this large turn-off range very undesirable when precise load control is required, but the circuit will not function when the turn-on is very late in the cycle. For example, if it is necessary to turn on the silicon-controlled rectifier at 175° and turn it off at 180°, the circuit will not operate for at least part of the time when for some application the turn-off range should vary between 170° and 180°.

The use of a power transistor in place of the silicon-control rectifier for motor control has been found to be quite inefficient for control, because transistors do not have the rapid turn-on and turn-off (snap action) of silicon-controlled rectifiers. This snap action is required for accurate and efficient motor control.

In FIGS. 4 through 7 are illustrated different embodiments of the present invention. The primary feature of each of the embodiments is the use of a low-power silicon-controlled rectifier in parallel with a power transistor wherein the silicon-controlled rectifier initially conducts current and then triggers the power transistor so that they together conduct the current to the load.

In FIG. 4 is illustrated control circuit 25, including a silicon-controlled rectifier 27, a transistor 29 and a resistor 31. The anode 33 of silicon-controlled rectifier 27 is connected to the collector 35 of transistor 29 and the cathode 37 of the silicon-controlled rectifier is connected to the base 39 of transistor 29 and to one side of resistor 31. The other side of resistor 31 is connected to the emitter 41 of transmitter 29 and to the load 13. The output of power source 11 is connected to the anode 33 of the silicon-controlled rectifier and to the collector 35 of the transistor. The emitter 41 of the transistor is also connected to the input of load 13. External control of the circuit is achieved by control signal device 17 the output of which is connected to the gate 43 of the silicon-controlled rectifier. Control circuit 25 provides two parallel current flow paths from power source 11 to load 13. One of these flow paths is from power source 11 through silicon-controlled rectifier 27 and resistor 31 to load 13. The other flow path is from power source 11 through transistor 29 to load 13.

The output signal from control signal device 17 is a pulse, the timing of which is relative to the time phase of the output signal from power source 11 which may be a full wave rectifier signal, as shown in FIG. 3. The control pulse of control signal device 17 may be generated by many different conventional techniques; however, characteristic of most of the control signal devices, it will sense the phase of power source 11 and it will have a variable delay circuit for determining when, during the half wave cycle of the power source signal, that the control signal pulse will occur to turn on the gate 43 of the silicon-controlled rectifier. That is, silicon-controlled rectifier 27 may be turned on anywhere from about 0° to about 180° of the half wave signal of power source 11.

The basic concept of the control circuit 25 of FIG. 4 is that at the start of the power transmission cycle, silicon-control rectifier 27 will turn on first and immediately thereafter transistor 29 will turn on. Then, at the termination of the power transmission cycle, silicon-controlled rectifier 27 will turn off first and immediately thereafter transistor 29 will turn off. However, for all practical purposes, the turn-off time of the silicon-controlled rectifier and the transistor occur at the same instant. Because of the resistance of resistor 31 in the first current path, the impedance of this path will be much greater than the impedance of the second current path, and therefore the second current path will conduct the major portion of the power. Therefore, when load 13 draws a large amount of power, transistor 29 is selected to be a high-power transistor and silicon-controlled rectifier 27 is selected to be a low-power silicon-controlled rectifier. Since the silicon-controlled rectifier has low-power characteristics, it requires very low holding current and will therefore consistently turn off very late in the cycle; that is, at point 4 or very nearly 180°.

In operation, the voltage at the anode 33 of the silicon-controlled rectifier is at a positive potential because the power output of the power source 11 is at positive potential. When a positive pulse is applied to gate 43 of silicon-controlled rectifier 27 the silicon-controlled rectifier is turned on and will remain on as long as the current passing therethrough is at or above its holding current level. Typically, for a low-power silicon-controlled rectifier there will be sufficient holding current when 15 milliamperes is flowing. It should also be noted that the silicon-controlled rectifier will remain on after the gate pulse is removed so long as the current passing therethrough is at or above the holding current level.

When the silicon-controlled rectifier is turned on then current will pass through resistor 31 to load 13. As the current level through the resistor increases, the voltage across the resistor increases. The voltage across the resistor is applied across the base and emitter of transistor 29 and when it reaches about 0.6 volts (typically) transistor 29 will turn on and will immediately drive to a saturated condition. When this occurs, transistor 29 will conduct most of the current to load 13. Transistor 29 will remain on so long as the positive emitter-base voltage difference is at least 0.6 volts. turn-off of the circuit will occur when the current level of silicon-controlled rectifier 27 decreases to a value of below 15 milliamperes which occurs at point 4 of FIG. 3 which is at almost 180°. When silicon-controlled rectifier 27 turns off then the voltage across resistor 31 goes to zero and transistor 29 turns off. This process is then repeated during the next cycle of operation.

The circuit of FIG. 5 is similar to the circuit of FIG. 4 except that a reactive element 45, either capacitive or inductive, is substituted in place of resistor 31.

When reactive element 45 is a capacitor, then silicon-controlled rectifier 27 and transistor 29 will turn on as the capacitor is being charged. The capacitor will have a voltage difference that is in excess of the positive base-emitter turn-on voltage to drive transistor 29 into saturation. However, after the capacitor has been charged then no additional current will be passed through the silicon-controlled rectifier to charge the capacitor and the current through the silicon-controlled rectifier will drop below its holding current level and the silicon-controlled rectifier will therefore turn off. Transistor 29 will also turn off because there is no longer any current available for maintaining the capacitor in the charged condition. From this it can be seen that this circuit is turned on by the control pulse applied to gate 43 of the silicon-controlled rectifier and is then automatically turned off when the capacitor becomes fully charged.

When reactive enough 45 is an inductor, then the silicon-controlled rectifier and the transistor will turn on as current is passed therethrough. Shut-off of this circuit is achieved when the rate of rise of the current in the inductor is insufficiently rapid. The the current is small enough then the current flow through the inductor is below the holding current level of the silicon-controlled rectifier, and it therefore turns off. When the silicon-controlled rectifier turns off then transistor 29 turns off, because the inductor discharges and the base-emitter voltage goes to zero. The rate of change of the current applied to the inductor may be determined by the shape and frequency of the current signal from power source 1!.

In FIG. 6 is illustrated another embodiment of the present invention. The circuit shown in FIG. 6 is the same in structure and operation as the circuit shown in FIG. 4 except for the addition of diode 47 and the use of a control signal applied at point B. Diode 47 has its anode 49 connected to the cathode 37 of silicon-controlled rectifier 27 and its cathode 51 connected to the base of transistor 29. The shut-off control signal is applied to the cathode 51, point B, of diode 47.

Operation of this circuit is started when a turn-on control signal pulse from control signal device 17 is applied to gate 43 of silicon-controlled rectifier 27. This control signal pulse causes silicon-controlled rectifier 27 to turn on, which causes a voltage drop to occur across resistor 45 which causes a positive base-emitter voltage across transistor 29 which turns on transistor 29. To turn off the circuit, a positive pulse is applied at point B which back biases diode 47 and prevents current from flowing from the silicon-controlled rectifier into the base of transistor 29. It also reduces the voltage drop across transistor 29. This causes the current through the silicon-controlled rectifier to drop below its holding current and therefore causes the silicon-controlled rectifier to turn off. When the pulse applied at point B is terminated, then transistor 29 turns off and no power is then applied to the load. A typical value of the holding current of the silicon-controlled rectifier is 15 milliamps and resistor 45 is selected to have a value (for example, 150 ohms resistance) so that 10 milliamps passes therethrough and the base current of transistor 29 may have a typical value of about 10 milliamps. Therefore, when the diode is back biased, the current passing through the silicon-controlled rectifier is the 10 milliamps drawn by resistor 45 which is less than the required 15 milliamps holding current and the silicon-controlled rectifier therefore turns off. It should be noted that the power source for the circuit of FIG. 6 may be a smooth DC current and not a pulsating signal as required in FIG. 4 circuit.

In FIG. 7 is illustrated still another embodiment of the present invention. In this circuit a transistor 53 is placed in series with resistor 45 and load 13. In addition, a resistor 55 shunts transistor 53 and resistor 57 is placed in series between control signal device 17 and the base 59 of transistor 53.

The operation of this circuit is dependent upon the voltage level of the control signal from control signal device 17. That is, transistor 53 is selected to that it turns on when its base to emitter voltage is greater than 0.6 volts and shuts off when it is less than 0.6 volts. To turn the circuit on, the voltage level of the control signal from control signal device 17 is selected to be 1.5 volts, for example. This causes transistor 53 to turn on and go into the saturated condition. This also causes silicon-controlled rectifier 27 to turn on and the voltage across resistor 45 then causes power transmitter 29 to turn on. As long as the control signal from control signal device 17 remains above 0.6 volts, the circuit will remain on. To turn the circuit off, the control signal from control signal device 17 is decreased to a value less than 0.6 volts. This causes transistor 53 to turn off which decreases the current passing through silicon-controlled rectifier to a value less than its holding current. This causes the silicon-controlled rectifier to turn off which causes the power transistor 29 to turn off because no current is passing through resistor 45. Resistor 57 is a current limiting resistor for transistor 53 and resistor 55 functions to protect the power transistor 29 by shunting leakage current from the silicon-controlled rectifier to the load and thereby preventing its buildup at the base of power transistor 29 when the circuit is supposed to be off. Effective values have been found for resistor 45 to be 150 ohms, resistor 55, 1,000 ohms, and resistor 57, 1,000 ohms.

Obviously, many modifications and variations of the present invention are possible in the light of the above teachings. It is therefore to be understood that within the scope of the appended claims, the invention may be practiced otherwise than as specifically described.

I claim:

1. A control device for conducting a load current to a load and comprising;

a silicon-controlled rectifier;

a transistor;

said silicon-controlled rectifier and said transistor being operatively connected in parallel and the parallel combination of the silicon-controlled rectifier and the transistor being connected in series with the load;

a connection between the cathode of the silicon-controlled rectifier and the base of the transistor; and means operatively connected in series with said silicon-controlled rectifier for turning on said transistor, said means including a resistor, another transistor operatively connected in series with said silicon-controlled rectifier and said resistor and wherein, a power source is operatively connected to the anode of said silicon-controlled rectifier and to the collector of said first mentioned transistor;

the cathode of said silicon-controlled rectifier is operatively connected to the base of said first mentioned transistor and to one side of said resistor;

the other side of said resistor is operatively connected to the collector of said second mentioned transistor;

a control signal device is operatively connected to the gate of said silicon-controlled rectifier and to the base of said second mentioned transistor; and a load is operatively connected to the emitter of said first mentioned transistor and to the emitter of said second mentioned transistor.

* * * * *

UNITED STATES PATENT OFFICE
CERTIFICATE OF CORRECTION

Patent No. 3,619,652     Dated November 9, 1971

Inventor(s) Hugh M. Ogle

It is certified that error appears in the above-identified patent and that said Letters Patent are hereby corrected as shown below:

Column 1, line 18 after "and" add -- ambient temperation. The use of a power transistor in place --.

Column 1, line 44

"internal" should be -- external --.

Column 2, lines 27 delete "which is" which is a repetition.

Column 2, line 43 delete "the" which is a repetition.

Signed and sealed this 13th day of June 1972.

(SEAL)
Attest:

EDWARD M. FLETCHER, JR.  
Attesting Officer

ROBERT GOTTSCHALK  
Commissioner of Patents